(12) United States Patent
Hasegawa

(10) Patent No.: US 7,502,423 B2
(45) Date of Patent: *Mar. 10, 2009

(54) DIGITAL MODULATOR AND DIGITAL MODULATION METHOD

(75) Inventor: Teruaki Hasegawa, Osaka (JP)

(73) Assignee: Panasonic Corporation, Osaka (JP)

( * ) Notice: Subject to any disclaimer, the term of this patent is extended or adjusted under 35 U.S.C. 154(b) by 228 days.

This patent is subject to a terminal disclaimer.

(21) Appl. No.: 11/399,467

(22) Filed: Apr. 7, 2006

(65) Prior Publication Data

US 2006/0227897 A1 Oct. 12, 2006

(30) Foreign Application Priority Data

Apr. 8, 2005 (JP) .............................. 2005-112593

(51) Int. Cl.
*H04L 27/00* (2006.01)
(52) U.S. Cl. ...................... 375/295; 375/298; 375/308; 375/371; 375/261; 375/300; 375/225

(58) Field of Classification Search ................. 375/298, 375/308, 371, 261, 300, 225
See application file for complete search history.

(56) References Cited

U.S. PATENT DOCUMENTS

| 6,091,765 A * | 7/2000 | Pietzold et al. ............. 375/219 |
| 2004/0037366 A1 * | 2/2004 | Crawford .................... 375/295 |

FOREIGN PATENT DOCUMENTS

JP 2002-335293 11/2002

* cited by examiner

*Primary Examiner*—Shuwang Liu
*Assistant Examiner*—Kabir A Timory
(74) *Attorney, Agent, or Firm*—McDermott Will & Emery LLP

(57) ABSTRACT

Each of a first oversampling filter and a second oversampling filter oversamples to an n×m times as high frequency as a symbol rate. The first and second oversampling filters then output output data having a sampling frequency to first and second CIC filters, respectively.

6 Claims, 4 Drawing Sheets

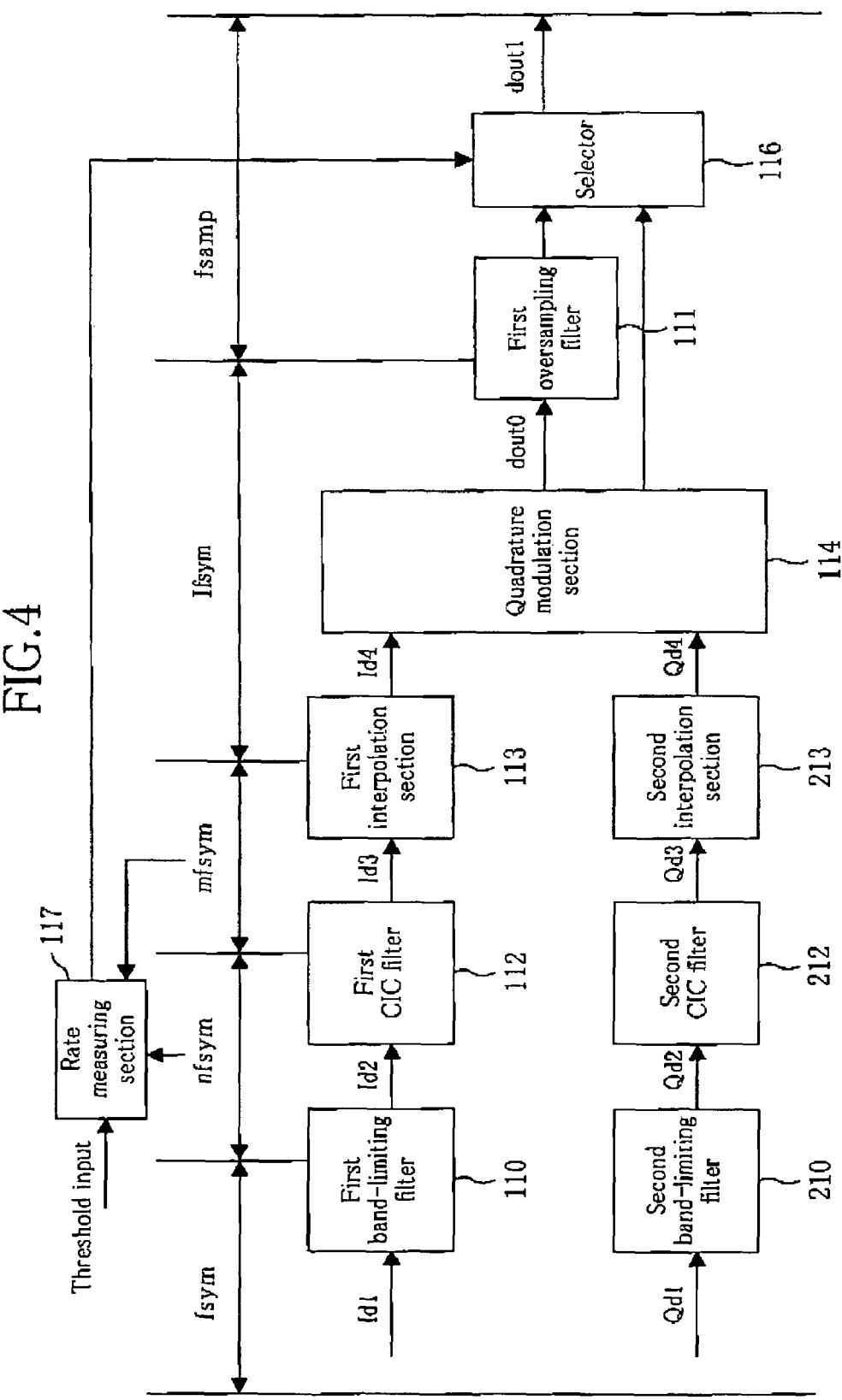

DIGITAL MODULATOR AND DIGITAL MODULATION METHOD

CROSS-REFERENCE TO RELATED APPLICATION

The disclosure of Japanese Patent Application No. 2005-112593 filed on Apr. 8, 2005 including specification, drawings and claims are incorporated herein by reference in its entirety.

BACKGROUND OF THE INVENTION

The present invention relates to a digital modulator and a digital modulation method, and more particularly relates to a technique for oversampling using a CIC (cascaded integrator-COMB) filter.

Conventionally, digital modulators have been used as transmitters or the like for digital cable TV set-top boxes and digital satellite broadcasting. In a digital modulator, after mapping, band limiting by an FIR filter is performed and then data is oversampled. Thereafter, the data is interpolated to a sampling frequency of a quadrature modulator and then is quadrature-modulated. (see, for example, Japanese Laid-Open Publication No. 2002-335293).

In another case, after mapping, band limiting is performed by an FIR filter and then data is oversampled by a CIC filter. Thereafter, the data is interpolated to a sampling frequency of a quadrature modulator and then is quadrature-modulated.

SUMMARY OF THE INVENTION

However, when the ratio between a sampling frequency (symbol rate) used in mapping and a sampling frequency used in oversampling by a CIC filter is large, signal components might be removed according to a cutoff frequency region of the CIC filter.

Furthermore, assume that a band is limited using route-divided roll-off filters each of which is formed of an FIR and, at the same time, data is converted to a desired sampling rate. In such a case, data has to be converted to a sampling rate at which signal components are not removed according to the cutoff frequency region of the CIC filter. This might result in increase in circuit size and power consumption.

In view of the above-described problems, the present invention has been devised and it is therefore an object of the present invention to allow digital modulation without reducing modulation quality when data received at a predetermined symbol rate is oversampled using a CIC filter or the like to a level close to an operation clock of a D/A converter.

It is another object of the present invention is to provide a digital modulator which allow reduction in circuit size and power consumption.

Specifically, the present invention provides a digital modulator for quadrature-modulating in-phase and quadrature component data and outputting a modulated signal at a predetermined output frequency. The digital modulator is characterized by including: a first filter for band-limiting the in-phase component data using a first sampling frequency obtained by multiplying a symbol frequency of the in-phase component data by an integer; a second filter for oversampling data output from the first filter using a second sampling frequency obtained by multiplying the first sampling frequency by an integer; a first CIC (cascaded integrator-COMB) filter for oversampling data output from the second filter using a third sampling frequency obtained by multiplying the second sampling frequency by an integer; a first interpolation section for interpolating data output from the first CIC filter to the predetermined output frequency; a third filter for band-limiting the quadrature component data using the first sampling frequency obtained by multiplying a symbol frequency of the quadrature component data by an integer; a fourth filter for oversampling data output from the third filter using the second sampling frequency obtained by multiplying the first sampling frequency by an integer; a second CIC (cascaded integrator-COMB) filter for oversampling data output from the fourth filter using the third sampling frequency obtained by multiplying the second sampling frequency by an integer; a second interpolation section for interpolating data output from the second CIC filter to the predetermined output frequency; and a quadrature modulation section for digital-quadrature-modulating data output from each of the first and second interpolation sections and outputting resultant data.

The digital modulator may further include a bypass section for outputting, when the ratio between the first sampling frequency and the third sampling frequency is smaller than a preset value, the data output from the first filter and the data output from the third filter to the first and second CIC filters, respectively, so that oversampling in each of the second and fourth filters is bypassed.

Moreover, the present invention provides a digital modulation method for quadrature-modulating in-phase and quadrature component data and outputting a modulated signal at a predetermined output frequency. The method is characterized by including: a first filtering step of band-limiting the in-phase component data using a first sampling frequency obtained by multiplying a symbol frequency of the in-phase component data by an integer; a second filtering step of oversampling data output in the first filtering step using a second sampling frequency obtained by multiplying the first sampling frequency by an integer; a first CIC filtering step of oversampling data output in the second filtering step using a third sampling frequency obtained by multiplying the second sampling frequency by an integer; a first interpolation step of interpolating data output in the first CIC filtering step to the predetermined output frequency; a third filtering step of band-limiting the quadrature component data using the first sampling frequency obtained by multiplying a symbol frequency of the quadrature component data by an integer; a fourth filtering step of oversampling data output in the third filtering step using the second sampling frequency obtained by multiplying the first sampling frequency by an integer; a second CIC filtering step of oversampling data output in the fourth filtering step using the third sampling frequency obtained by multiplying the second sampling frequency by an integer; a second interpolation step of interpolating data output in the second CIC filtering step to the predetermined output frequency; and a quadrature modulation step of digital-quadrature-modulating data output in each of the first and second interpolation filtering steps and outputting resultant data.

As described above, according to the present invention, before or after oversampling in a CIC filter, oversampling is performed using an IFT filter having a fixed oversampling rate. Thus, high quality digital modulation can be achieved. Therefore, the present invention is advantageous in reduction in circuit size and power consumption.

BRIEF DESCRIPTION OF THE DRAWINGS

FIG. 4 is a block diagram illustrating a configuration of a digital modulator according to a fourth embodiment of the present invention.

DESCRIPTION OF THE PREFERRED EMBODIMENTS

Hereinafter, preferred embodiments of the present invention will be described with reference to the accompanying drawings. The following description of preferred embodiments of the present invention is substantially intended only for purposes of illustration and not of limitation of the present invention and its application and use.

Embodiment 1

Figure 1:
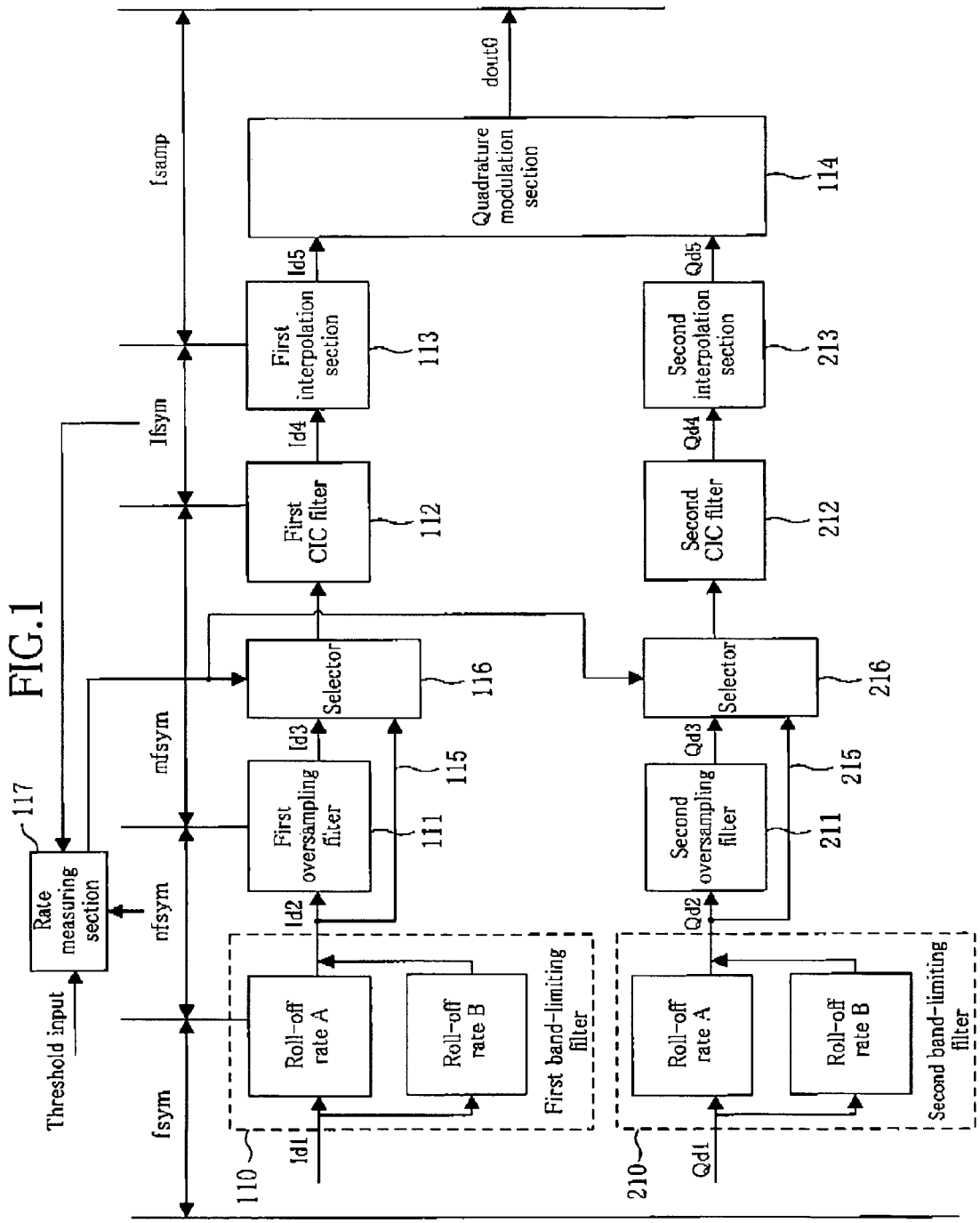
FIG. 1 is a block diagram illustrating a configuration of a digital modulator according to a first embodiment of the present invention.

FIG. 1 is a block diagram illustrating a configuration of a digital modulator according to a first embodiment of the present invention. In FIG. 1, the reference numeral 110 denotes a first band limiting filter formed of, for example, a low pass filter (route roll-off filter). The first band limiting filter 110 performs band limiting in which intersymbol interference for digital signals is suppressed using a route roll-off characteristic. In the first band limiting filter 110, an operation is performed at an operation frequency n (n is an integer) times as high as a symbol frequency $f_{sym}$, so that interpolation is performed with n times higher interpolation accuracy.

The first band limiting filter 110 may be so configured to maintain a plurality of route roll-off rate characteristics and select one of them.

In this case, when an in-phase component data $I_d1$ of the symbol frequency $f_{sym}$ is received by the first band limiting filter 110, the in-phase component data $I_d1$ is frequency-converted to an n times higher frequency $nf_{sym}$ and an output data $I_d2$ resulting from the frequency conversion is output to the first oversampling filter 111.

The first oversampling filter 111 oversamples a digital signal to perform an operation at an operation frequency m (m is an integer) times as high as the frequency $nf_{sym}$, thereby performing interpolation with m times higher interpolation accuracy.

When the output data $I_d2$ of the sampling frequency $nf_{sym}$ is received by the first oversampling filter 111, the output data $I_d2$ is frequency-converted to an m times higher sampling frequency $mf_{sym}$ and an output data $I_d3$ resulting from the frequency conversion is output to a first CIC filter 112. Thus, a sampling frequency $mf_{sym}$ becomes n×m times as high as the symbol frequency $f_{sym}$.

A bypass route 115 for outputting the output data $I_d2$ to the first CIC filter 112 without the output data $I_d2$ passing through the first oversampling filter 111 may be provided. Thus, when the ratio between the sampling frequency $nf_{sym}$ of the output data $I_d2$ and a sampling frequency $If_{sm}$ of an output data $I_d4$ from the first CIC filter 112, which will be described later, is lower than a preset threshold as measured by a rate ratio measuring section 117, the output data $I_d2$ is output to the first CIC filter 112 through the bypass 115 and selector 116 without the output data $I_d2$ oversampled by the first oversampling filter 111.

When the ratio between a symbol rate and an operation clock of a D/A converter (not shown) to which data is output is equal to or larger than a preset threshold, the first oversampling filter 111 may be bypassed so that oversampling is not performed therein. Thus, the output data $I_d2$ is output as it is to the first CIC filter 112. The configuration in which the bypass route 115 is provided for the first oversampling filter 111 is applicable to the following second through fourth embodiments in the same manner as in this embodiment.

The first CIC filter 112 oversamples a digital signal to perform an operation at an operation frequency I (I is an integer) times as high as the frequency $mf_{sym}$, thereby performing interpolation with I times higher interpolation accuracy.

In this case, when the output date $I_d3$ of the sampling frequency $mf_{sym}$ is received by the first CIC filter 112, the output data $I_d3$ is frequency-converted to an I times higher sampling frequency $If_{sym}$ and an output data $I_d4$ resulting from the frequency conversion is outputted to the first interpolation section 113. Thus, the sampling frequency $If_{sym}$ becomes n×m×I times as high as the symbol frequency $f_{sym}$.

The first interpolation section 113 samples the output data $I_d4$ of the received sampling frequency $If_{sym}$ to a sampling frequency $f_{samp}$, i.e., an operation clock frequency of a D/A converter (not shown) to which the output data $I_d4$ is output, thereby interpolating the output data $I_d4$. An output data $I_d5$ of the sampling frequency $f_{samp}$ resulting from the interpolation is output to a quadrature modulation section 114.

The reference numeral 210 denotes a second band limiting filter. The second band limiting filter 210 is formed of, for example, a low pass filter (route roll-off filter) and performs band limiting in which intersymbol interference for digital signals is suppressed using a route roll-off characteristic. In the second band limiting filter 210, an operation is performed at an operation frequency n (n is an integer) times as high as a symbol frequency $f_{sym}$, so that interpolation is performed with n times higher accuracy.

The second band limiting filter 210 may be so configured to maintain a plurality of route roll-off rate characteristics and select one of them.

In this case, when a quadrature component data $Q_d1$ of the symbol frequency $f_{sym}$ is received by the second band limiting filter 210, the quadrature component data $Q_d1$ is frequency-converted to an n times higher frequency $nf_{sym}$ and an output data $Q_d2$ resulting from the frequency conversion is output to a second over sampling filter 211.

The second oversampling filter 211 oversamples a digital signal to perform an operation at an operation frequency m (m is an integer) times as high as the frequency $nf_{sym}$, thereby performing interpolation with m times higher accuracy.

When the output data $Q_d2$ of the sampling frequency $nf_{sym}$ is received by the second oversampling filter 211, the output data $Q_d2$ is frequency-converted to an m times higher sampling frequency $mf_{sym}$ and an output data $Q_d3$ resulting from the frequency conversion is output to a second CIC filter 212. Thus, the sampling frequency $mf_{sym}$ becomes n×m times as high as the symbol frequency $f_{sym}$.

A bypass route 215 for outputting the output data $Q_d2$ to the second CIC filter 212 without the output data $Q_d2$ passing through the second oversampling filter 211 may be provided. Thus, when the ratio between the sampling frequency $nf_{sym}$ of the output data $Q_d2$ and the sampling frequency $IF_{sym}$ of an output data $Q_d4$ from the second CIC filter 212 which will be described later is lower than a preset threshold as measured by a rate ratio measuring section 117, the output data $Q_d2$ is output to the second CIC filter 212 through the bypass route 215 and selector 216 without the output data $Q_d2$ oversampled by the second oversampling filter 211.

Moreover, when the ratio between a symbol rate and an operation clock of a D/A converter (not shown) to which data is output is equal to or larger than a preset threshold, the second oversampling filter 211 may be bypassed without performing oversampling therein so that the data is output as it is to the second CIC filter 212. The configuration in which the bypass route 215 is provided for the second oversampling filter 211 is applicable to the following second through fourth embodiments in the same manner as in this embodiment.

The second CIC filter 212 oversamples a digital signal and performs an operation at an operation frequency I (I is an integer) times as high as the frequency $mf_{sym}$, thereby performing interpolation with I times higher accuracy.

In this case, when the output date $Q_d3$ of the sampling frequency $mf_{sym}$ is received by the second CIC filter 212, the output data $Q_d3$ is frequency-converted to an I times higher sampling frequency $If_{sym}$ and an output data $Q_d4$ resulting from the frequency conversion is output to a second interpolation section 213. Thus, the sampling frequency $If_{sym}$ becomes n×m×I times as high as the symbol frequency $f_{sym}$.

The second interpolation section 213 samples the output data $Q_d4$ of the received sampling frequency $If_{sym}$ to a sampling frequency $f_{samp}$, i.e., an operation clock frequency of a D/A converter (not shown) to which the output data $Q_d4$ is output, thereby interpolating the output data $Q_d4$. An output data $Q_d5$ of the sampling frequency $f_{samp}$ resulting from the interpolation is output to the quadrature modulation section 114.

The quadrature modulation section 114 quadrature-modulates each of the output data $I_d5$ of an in-phase component and the output data $Q_d5$ of a quadrature component and outputs an output data $d_{out}$ resulting from the quadrature modulation to a D/A conversion section (not shown) which operates at an operation clock of the sampling frequency $f_{samp}$.

Specifically, the quadrature modulation section 114 includes two complex multiplication sections, an NCO (numerical control oscillator), and an adder. One of the two complex multiplication sections multiplies the output data $I_d5$ of the in-phase component by a digital trigonometric function cos transmitted by the NCO. The other one of the two complex multiplication sections multiplies the output data $Q_d5$ of the quadrature component by a digital trigonometric function sin transmitted by the NCO.

The adder adds data output from one of the complex multiplication sections to that of the other one of the complex multiplication sections and outputs the output data $d_{out}$ from the quadrature modulation section 114.

With the above-described configuration, data received at a predetermined symbol late can be digital-modulated without reducing modulation quality when the data is oversampled to a level close to an operation clock of the D/A converter using a CIC filter and the like.

Embodiment 2

Figure 2:
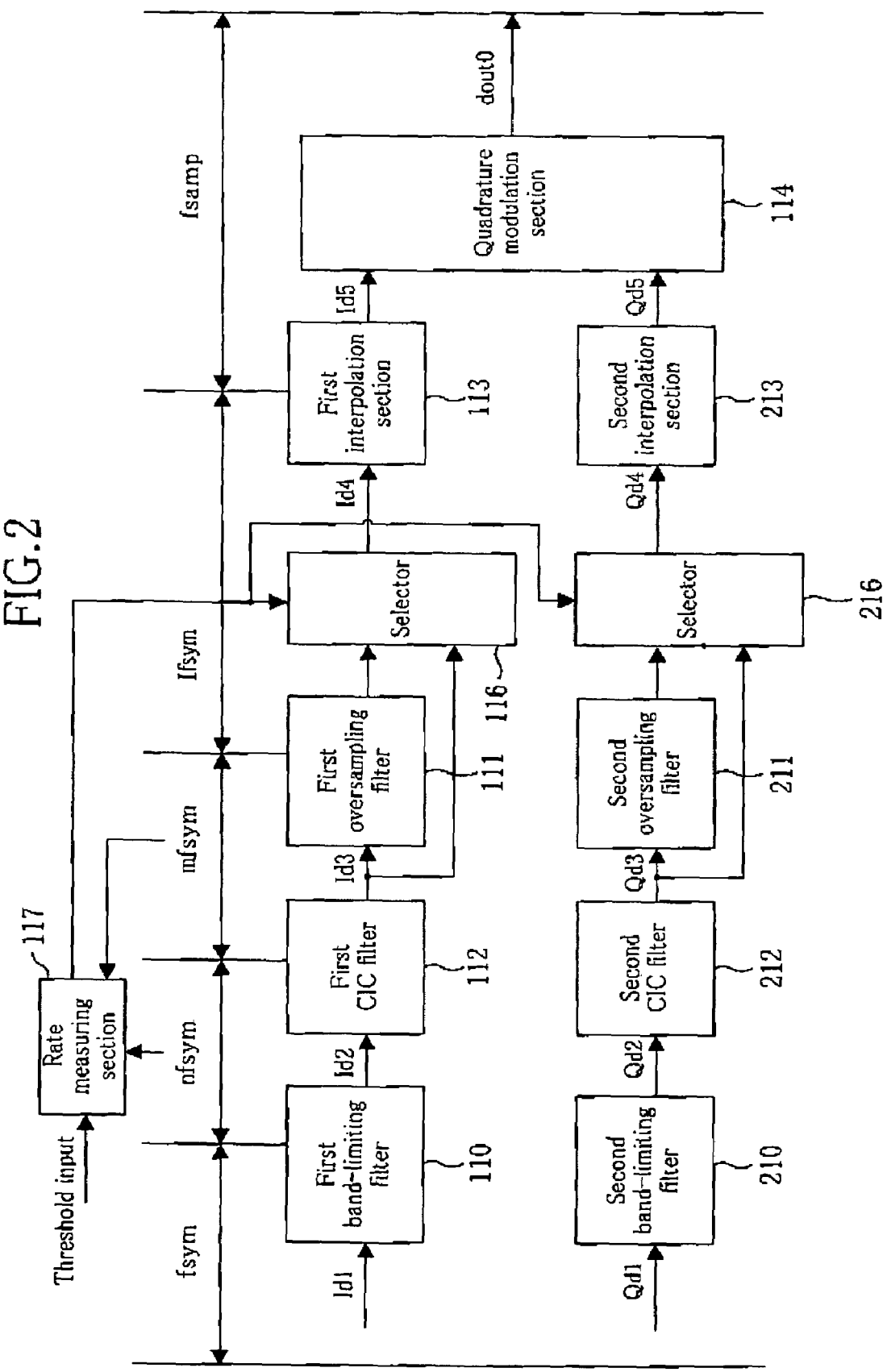
FIG. 2 is a block diagram illustrating a configuration of a digital modulator according to a second embodiment of the present invention.

FIG. 2 is a block diagram illustrating a configuration of a digital modulator according to a second embodiment of the present invention. The second embodiment is different from the first embodiment only in an arrangement of the first and second oversampling filters 111 and 211. Therefore, each member also shown in the first embodiment is identified by the same reference numeral and only different points will be described.

As shown in FIG. 2, in-phase component data $I_d1$ of a symbol frequency $f_{sym}$ received by a first band limiting filter 100 is frequency-converted to an n times higher frequency $nf_{sym}$ and an output data $I_d2$ resulting from the frequency conversion is output to a first CIC filter 112.

The output data $I_d2$ of the sampling frequency $nf_{sym}$ received by the first CIC filter 112 is frequency-converted to an m times higher sampling frequency $mf_{sym}$ and an output data $I_d3$ resulting from the frequency conversion is output to the first oversampling filter 111. Thus, the sampling frequency $mf_{sym}$ becomes n×m times as high as the symbol frequency $f_{sym}$.

The output data $I_d3$ of the sampling frequency $mf_{sym}$ received by the first oversampling filter 111 is frequency-converted to an I times higher sampling frequency $If_{sym}$ and an output data $I_d4$ resulting from the frequency conversion is output to a first interpolation section 113. Thus, the sampling frequency $If_{sym}$ becomes n×m×I times as high as the symbol frequency $f_{sym}$.

When the ratio between a sampling frequency of the output data $Q_d2$ and a sampling frequency of the output data $Q_d3$ is larger than a preset threshold, the output data $I_d3$ may be output to the second interpolation section 113 in a subsequent stage through a bypass route so that oversampling is not performed in the second oversampling filter 111.

The output data $I_d4$ of the sampling frequency $If_{ysm}$ received by the first interpolation section 113 is sampled to a sampling frequency $f_{samp}$, i.e., an operation clock frequency of a D/A converter (not shown) to which the output data $I_d4$ is output and then is interpolated, and an output data $I_d5$ obtained by the interpolation is output to a quadrature modulation section 114.

A quadrature component data $Q_d1$ of the symbol frequency $f_{sym}$ received by a second band limiting filter 210 is frequency-converted to an n times higher frequency $nf_{sym}$ and an output data $Q_d2$ resulting from the frequency conversion is output to a second CIC filter 212.

The output data $Q_d2$ of the sampling frequency $nf_{sym}$ received by the second CIC filter 212 is frequency-converted to an m times higher sampling frequency $mf_{sym}$ and an output data $Q_d3$ resulting from the frequency conversion is output to a second oversampling filter 211. Thus, the sampling frequency $mf_{sym}$ becomes n×m times as high as the symbol frequency $f_{sym}$.

The output data $Q_d3$ of the sampling frequency $mf_{sym}$ received by the second oversampling filter 211 is frequency-converted to an I times higher sampling frequency $If_{sym}$. An output data $Q_d4$ resulting from the frequency conversion is output to a second interpolation section 213. Thus, the sampling frequency $If_{sym}$ becomes n×m×I times as high as the symbol frequency $f_{sym}$.

When the ratio between a sampling frequency of the output data $Q_d2$ and a sampling frequency of the output data $Q_d3$ is larger then a preset threshold, the output data $Q_d3$ may be output to the second interpolation section 213 in a subsequent stage through a bypass route so that oversampling is not performed in the second oversampling filter 211.

The output data $Q_d4$ of the sampling frequency $If_{sym}$ received by the second interpolation section 213 is sampled to a sampling frequency $f_{samp}$, i.e., an operation clock frequency of a D/A conversion section (not shown) to which the output data $Q_d4$ is output and then is interpolated, and an output data $Q_d5$ resulting from the interpolation is output to the quadrature conversion modulation section 114.

Then, each of the output data $I_d5$ of an in-phase component received by the quadrature modulation section 114 and the output data $Q_d5$ of a quadrature component is quadrature-modulated and an output data $d_{out}$ resulting from the quadrature modulation is output to the D/A conversion section (not shown) which operates at an operation clock of the sampling frequency $f_{samp}$.

As described above, the first and second oversampling filters 111 and 211 are located in a subsequent stage of the first and second CIC filters 112 and 212, respectively, so that the respective operation clocks of the first and second CIC filters 112 and 212 can be reduced and the quadrature data component and the in-phase data component can be multiplexed. Therefore, this embodiment is advantageous to reduction in circuit size.

Embodiment 3

Figure 3:
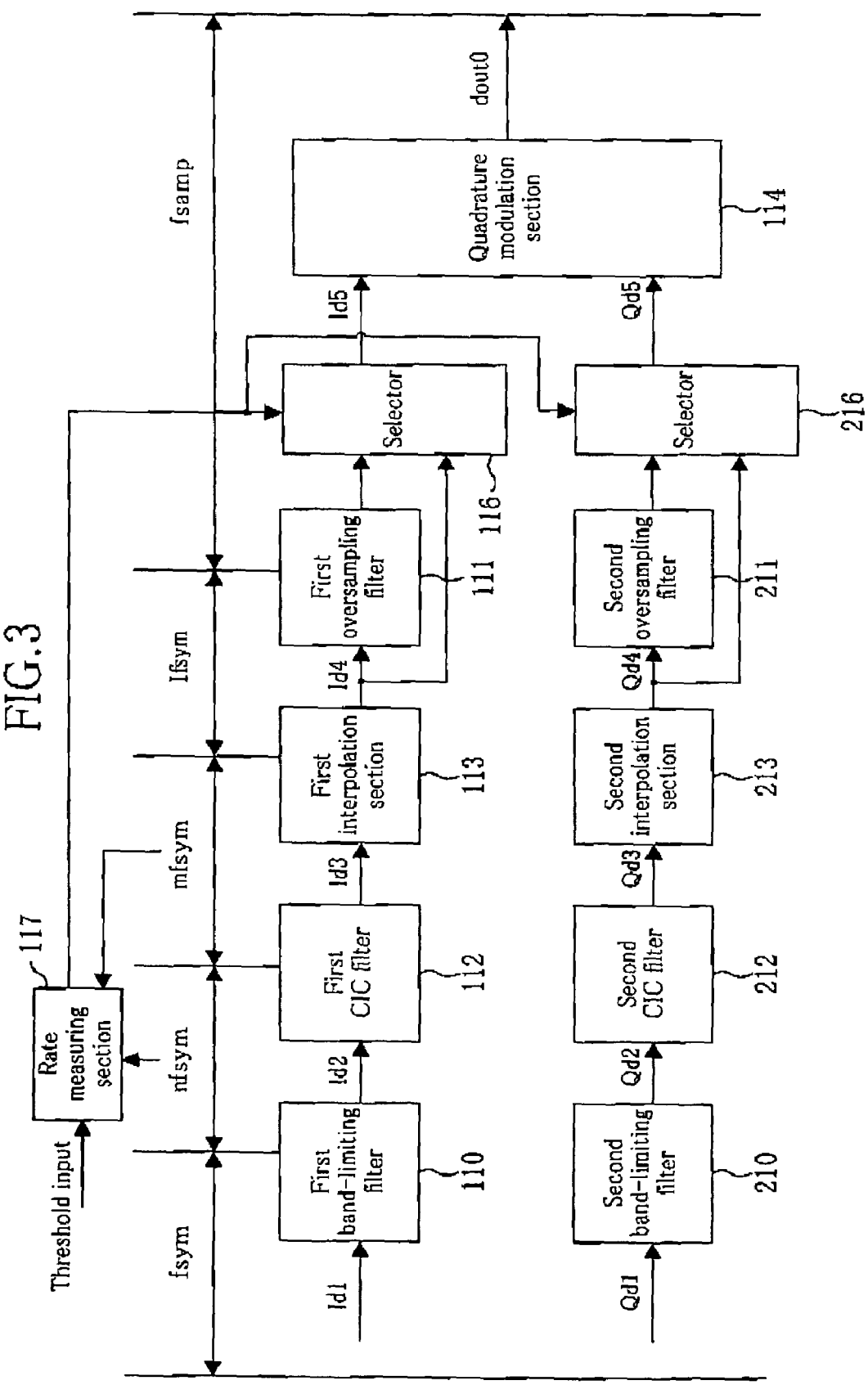
FIG. 3 is a block diagram illustrating a configuration of a digital modulator according to a third embodiment of the present invention.

FIG. 3 is a block diagram illustrating a configuration of a digital modulator according to a third embodiment of the present invention. The third embodiment is different from the first embodiment only in an arrangement of the first and second oversampling filters 111 and 211. Therefore, each member also shown in the first embodiment is identified by the same reference numeral and only different points will be described.

As shown in FIG. 3, an in-phase component data $I_d1$ of a symbol frequency $f_{sym}$ received by a first band limiting filter 110 is frequency-converted to an n times higher frequency $nf_{sym}$ and an output data $I_d2$ resulting from the frequency conversion is output to a first CIC filter 112.

The output data $I_d2$ of the sampling frequency $nf_{sym}$ received by the CIC filter 112 is frequency-converted to an m times higher sampling frequency $mf_{sym}$ and an output data $I_d3$ resulting from the frequency conversion is output to a first interpolation section 113. Thus, the sampling frequency $mf_{sym}$ becomes n×m times as high as the symbol frequency $f_{sym}$.

The output data $I_d3$ of the sampling frequency $mf_{sym}$ received by the first interpolation section 113 is frequency-converted to an I times higher sampling frequency $If_{sym}$ and an output data $I_d4$ resulting from the frequency conversion is output to a first oversampling filter 111. Thus, the sampling frequency $If_{sym}$ becomes n×m×I times as high as the symbol frequency $f_{sym}$.

The output data $I_d4$ of the sampling frequency $If_{sym}$ received by the first oversampling filter 111 is frequency-converted to a sampling frequency $f_{samp}$, i.e., an operation clock frequency of a D/A conversion section (not shown) to which the output data $I_d4$ is output and an output data $I_d5$ resulting from the frequency conversion is output to a quadrature modulation section 114.

When the ratio between a sampling frequency of the output data $I_d2$ and a sampling frequency of the output data $I_d3$ is larger then a preset threshold, the output data $I_d4$ may be output to the quadrature modulation section 114 in a subsequent stage through a bypass route so that oversampling is not performed in the first oversampling filter 111.

A quadrature component data $Q_d1$ of the symbol frequency received by a second band limiting filter 210 is frequency-converted to an n times higher frequency $nf_{sym}$ and an output data $Q_d2$ resulting from the frequency conversion is output to a second CIC filter 212.

The output data $Q_d2$ of the sampling frequency $nf_{sym}$ received by the second CIC filter 212 is frequency-converted to an m times higher sampling frequency $mf_{sym}$ and an output data $Q_d3$ resulting from the frequency conversion is output to a second oversampling filter 213. Thus, the sampling frequency $mf_{sym}$ becomes n×m times as high as the symbol frequency $f_{sym}$.

The output data $Q_d3$ of the sampling frequency $mf_{sym}$ received by the second interpolation section 213 is frequency-converted to an I times higher sampling frequency $If_{sym}$. An output data $Q_d4$ resulting from the frequency conversion is output to a second oversampling filter 211. Thus, the sampling frequency $If_{sym}$ becomes n×m×I times as high as the symbol frequency $f_{sym}$.

The output data $Q_d4$ of the sampling frequency $If_{sym}$ received by the second interpolation section 211 is frequency-converted to a sampling frequency $f_{samp}$, i.e., an operation clock frequency of a D/A conversion section (not shown) to which the output data $Q_d4$ is output and an output data $Q_d5$ resulting from the interpolation is output to the quadrature conversion modulation section 114.

When the ratio between a sampling frequency of the output data $Q_d2$ and a sampling frequency of the output data $Q_d3$ is larger than a preset threshold, the output data $Q_d4$ may be output to the quadrature modulation section 114 in a subsequent stage through a bypass route so that oversampling is not performed in the second oversampling filter 211.

Then, each of the output data $I_d5$ of an in-phase component received by the quadrature modulation section 114 and the output data $Q_d5$ of a quadrature component is quadrature-modulated and an output data $d_{out}$ resulting from the quadrature modulation is output to the D/A conversion section (not shown) which operates at an operation clock of the sampling frequency $f_{samp}$.

As described above, the first and second oversampling filters 111 and 211 are located in subsequent stages of the first and second interpolation sections 113 and 213, respectively, so that the respective operation clocks of the first and second CIC filters 112 and 212 can be reduced and the quadrature data component and the in-phase data component can be multiplexed. Therefore, this embodiment is advantageous to reduction in circuit size.

Embodiment 4

FIG. 4 is a block diagram illustrating a configuration of a digital modulator according to a fourth embodiment of the present invention. The fourth embodiment is mainly different from the first embodiment only in an arrangement of a first oversampling filter 111. Therefore, each member also shown in the first embodiment is identified by the same reference numeral and only different points will be described.

As shown in FIG. 4, an in-phase component data $I_d1$ of a symbol frequency $f_{sym}$ received by a first band limiting filter 110 is frequency-converted to an n times higher frequency $nf_{sym}$ and an output data $I_d2$ resulting from the frequency conversion is output to a first CIC filter 112.

The output data $I_d2$ of the sampling frequency $nf_{sym}$ received by the first CIC filter 112 is frequency-converted to an m times higher sampling frequency $mf_{sym}$ and an output data $I_d3$ resulting from the frequency conversion is output to the first interpolation section 113. Thus, the sampling frequency $mf_{sym}$ becomes n×m times as high as the symbol frequency $f_{sym}$.

The output data $I_d3$ of the sampling frequency $mf_{sym}$ received by the first interpolation section 113 is frequency-converted to an I times higher sampling frequency $If_{sym}$ and an output data $I_d4$ resulting from the frequency conversion is output to a quadrature modulation section 114. Thus, the sampling frequency $If_{sym}$ becomes n×m×times as high as the symbol frequency $f_{sym}$.

A quadrature component data $Q_d1$ of the symbol frequency $f_{sym}$ received by a second band limiting filter 210 is frequency-converted to an n times higher frequency $nf_{sym}$ and an output data $Q_d2$ resulting from the frequency conversion is output to a second CIC filter 212.

The output data $Q_d2$ of the sampling frequency $nf_{sym}$ received by the second CIC filter 212 is frequency-converted to an m times higher sampling frequency $mf_{sym}$ and an output data $Q_d3$ resulting from the frequency conversion is output to a second interpolation section 213. Thus, the sampling frequency $mf_{sym}$ becomes n×m times as high as the symbol frequency $f_{sym}$.

The output data $Q_d3$ of the sampling frequency $mf_{sym}$ received by the second interpolation section 213 is frequency-converted to an I times higher sampling frequency $If_{sym}$. An output data $Q_d4$ resulting from the frequency conversion is output to a quadrature modulation section 114. Thus, the sampling frequency $If_{sym}$ becomes n×m×l times as high as the symbol frequency $f_{sym}$.

Then, each of the output data $I_d4$ of an in-phase component received by the quadrature modulation section 114 and the output data $Q_d4$ of a quadrature component is quadrature-modulated and an output data $d_{out}0$ resulting from the quadrature modulation is output to a first oversampling filter 111.

The output data $d_{out}0$ of the sampling frequency $If_{sym}$ received by the first oversampling filter 111 is frequency-converted to a sampling frequency $f_{samp}$, i.e., an operation clock frequency of a D/A conversion section (not shown) to which the output data $d_{out}0$ is output and an output data $d_{out}1$ resulting from the frequency conversion is output to the D/A conversion section (not shown).

When the ratio between a sampling frequency of the output data $I_d2$ and a sampling frequency of the output data $I_d3$ is larger than a preset threshold, the output data $d_{out}0$ may be output as it is through a bypass route so that oversampling is not performed in the first oversampling filter 111.

As described above, the first oversampling filter 111 is located in a subsequent stage of the quadrature modulation section 114, so that instead of separate two oversampling filters which usually have to be provided for in-phase component data and quadrature component data, respectively, only one over sampling filter can be provided. Therefore, this embodiment is advantageous to reduction in circuit size.

As has been described, a digital modulator according to the present invention allows digital modulation without reducing modulation quality when data received at a predetermined symbol rate is oversampled to around an operation clock of a D/A converter using a CIC filter or the like and thus is considered highly effective in practical use. Therefore, the inventive digital modulator is very useful and has high industrial applicability.

What is claimed is:

1. A digital modulator for quadrature-modulating in-phase and quadrature component data and outputting a modulated signal at a predetermined output frequency, the digital modulator comprising:

a first filter for band-limiting the in-phase component data using a first sampling frequency obtained by multiplying a symbol frequency of the in-phase component data by an integer;

a second filter for oversampling data output from the first filter using a second sampling frequency obtained by multiplying the first sampling frequency by an integer;

a first CIC (cascaded integrator-COMB) filter for oversampling data output from the second filter using a third sampling frequency obtained by multiplying the second sampling frequency by an integer;

a first interpolation section for interpolating data output from the first CIC filter to the predetermined output frequency;

a third filter for band-limiting the quadrature component data using the first sampling frequency obtained by multiplying a symbol frequency of the quadrature component data by an integer;

a fourth filter for oversampling data output from the third filter using the second sampling frequency obtained by multiplying the first sampling frequency by an integer;

a second CIC (cascaded integrator-COMB) filter for oversampling data output from the fourth filter using the third sampling frequency obtained by multiplying the second sampling frequency by an integer;

a second interpolation section for interpolating data output from the second CIC filter to the predetermined output frequency;

a quadrature modulation section for digital-quadrature-modulating data output from each of the first and second interpolation sections and outputting resultant data; and a bypass section for outputting, when a ratio between the first sampling frequency and the third sampling frequency is smaller than a preset value, the data output from the first filter and the data output from the third filter to the first and second CIC filters, respectively, so that oversampling in each of the second and fourth filters is bypassed.

2. A digital modulator for quadrature-modulating in-phase and quadrature component data and outputting a modulated signal at a predetermined output frequency, the digital modulator comprising:

a first filter for band-limiting the in-phase component data using a first sampling frequency obtained by multiplying a symbol frequency of the in-phase component data by an integer;

a first CIC filter for oversampling data output from the first filter using a second sampling frequency obtained by multiplying the first sampling frequency by an integer;

a second filter for oversampling data output from the first CIC filter using a third sampling frequency obtained by multiplying the second sampling frequency by an integer;

a first interpolation section for interpolating data output from the first CIC filter to the predetermined output frequency;

a third filter for band-limiting the quadrature component data using the first sampling frequency obtained by multiplying a symbol frequency of the quadrature component data by an integer;

a second CIC filter for oversampling data output from the third filter using the second sampling frequency obtained by multiplying the first sampling frequency by an integer;

a fourth filter for oversampling data output from the second CIC filter using the third sampling frequency obtained by multiplying the second sampling frequency by an integer;

a second interpolation section for interpolating data output from the fourth filter to the predetermined output frequency;

a quadrature modulation section for digital-quadrature-modulating data output from each of the first and second interpolation sections and outputting resultant data; and a bypass section for outputting, when a ratio between the first sampling frequency and the second sampling frequency is larger than a preset value, the data output from the first filter and the data output from the second CIC filter to the first and second interpolation sections, respectively, so that oversampling in each of the second and fourth filters is bypassed.

3. A digital modulator for quadrature-modulating in-phase and quadrature component data and outputting a modulated signal at a predetermined output frequency, the digital modulator comprising:
- a first filter for band-limiting the in-phase component data using a first sampling frequency obtained by multiplying a symbol frequency of the in-phase component data by an integer;
- a first CIC filter for oversampling data output from the first filter using a second sampling frequency obtained by multiplying the first sampling frequency by an integer;
- a first interpolation section for interpolating data output from the first CIC filter using a third sampling frequency obtained by dividing the second sampling frequency by an integer;
- a second filter for oversampling data output from the first interpolation section to the predetermined output frequency;
- a third filter for band-limiting the quadrature component data using the first sampling frequency obtained by multiplying a symbol frequency of the quadrature component data by an integer;
- a second CIC filter for oversampling data output from the third filter using the second sampling frequency obtained by multiplying the first sampling frequency by an integer;
- a second interpolation section for interpolating data output from the second CIC filter using the third sampling frequency obtained by dividing the predetermined output frequency by an integer;
- a fourth filter for oversampling data output from the second interpolation to the predetermined output frequency;
- a quadrature modulation section for digital-quadrature-modulating data output from each of the second and fourth filters and outputting resultant data; and
- a bypass section for outputting, when a ratio between the first sampling frequency and the second sampling frequency is larger than a preset value, the data output from the first interpolation and the data output from the second interpolation to the second and fourth filters, respectively, so that oversampling in each of the second and fourth filters is bypassed.

4. A digital modulator for quadrature-modulating in-phase and quadrature component data and outputting a modulated signal at a predetermined output frequency, the digital modulator comprising:
- a first filter for band-limiting the in-phase component data using a first sampling frequency obtained by multiplying a symbol frequency of the in-phase component data by an integer;
- a first CIC filter for oversampling data output from the first filter using a second sampling frequency obtained by multiplying the first sampling frequency by an integer;
- a first interpolation section for interpolating data output from the CIC filter using a third sampling frequency obtained by dividing the predetermined output frequency by an integer;
- a second filter for band-limiting the in-phase component data using the first sampling frequency obtained by multiplying a symbol frequency of the quadrature component data by an integer;
- a second CIC filter for oversampling data output from the second filter using the second sampling frequency obtained by multiplying the sampling frequency by an integer;
- a second interpolation section for interpolating data output from the second CIC filter using the third sampling frequency obtained by dividing the predetermined output frequency by an integer;
- a quadrature modulation section for digital-quadrature-modulating data output from each of the first and second interpolation sections and outputting resultant data;
- a third filter for oversampling data output from the quadrature modulation section to the predetermined output frequency; and
- a bypass section for outputting, when a ratio between the first sampling frequency and the second sampling frequency is larger than a preset value, the data output from the quadrature modulation section so that oversampling in the third filter is bypassed.

5. A digital modulation method for quadrature-modulating in-phase and quadrature component data and outputting a modulated signal at a predetermined output frequency, the method comprising:
- a first filtering step of band-limiting the in-phase component data using a first sampling frequency obtained by multiplying a symbol frequency of the in-phase component data by an integer;
- a second filtering step of oversampling data output in the first filtering step using a second sampling frequency obtained by multiplying the first sampling frequency by an integer;
- a first CIC filtering step of oversampling data output in the second filtering step using a third sampling frequency obtained by multiplying the second sampling frequency by an integer;
- a first interpolation step of interpolating data output in the first CIC filtering step to the predetermined output frequency;
- a third filtering step of band-limiting the quadrature component data using the first sampling frequency obtained by multiplying a symbol frequency of the quadrature component data by an integer;
- a fourth filtering step of oversampling data output in the third filtering step using the second sampling frequency obtained by multiplying the first sampling frequency by an integer;
- a second CIC filtering step of oversampling data output in the fourth filtering step using the third sampling frequency obtained by multiplying the second sampling frequency by an integer;
- a second interpolation step of interpolating data output in the second CIC filtering step to the predetermined output frequency;
- a quadrature modulation step of digital-quadrature-modulating data output in each of the first and second interpolation filtering steps and outputting resultant data; and
- a bypass step of outputting, when a ratio between the first sampling frequency and the third sampling frequency is smaller than a preset value, the data output in the first filtering step and the data output in the third filtering step so that oversampling in each of the second and fourth filtering steps is bypassed.

6. A digital modulation method for quadrature-modulating in-phase and quadrature component data and outputting a modulated signal at a predetermined output frequency, the digital modulator comprising:
- a first filtering step of band-limiting the in-phase component data using a first sampling frequency obtained by multiplying a symbol frequency of the in-phase component data by an integer;

a first CIC filtering step of oversampling data output in the first filtering step using a second sampling frequency obtained by multiplying the first sampling frequency by an integer;

a first interpolation step of interpolating data output in the CIC filtering step using a third sampling frequency obtained by dividing the predetermined output frequency by an integer;

a second filtering step of band-limiting the in-phase component data using the first sampling frequency obtained by multiplying a symbol frequency of the quadrature component data by an integer;

a second CIC filtering step of oversampling data output in the second filtering step using the second sampling frequency obtained by multiplying the first sampling frequency by an integer;

a second interpolation step of interpolating data output in the second CIC filtering step using the third sampling frequency obtained by dividing the predetermined output frequency by an integer;

a quadrature modulation step of digital-quadrature-modulating data output in each of the first and second interpolation steps and outputting resultant data;

a third filtering step of oversampling data output in the quadrature modulation step to the predetermined output frequency; and a bypass step of outputting, when a ratio between the first sampling frequency and the second sampling frequency is larger than a preset value, the data output in the quadrature modulation step so that oversampling in the third filtering step is bypassed.

* * * * *